(12) United States Patent
Chen et al.

(10) Patent No.: US 11,438,149 B2
(45) Date of Patent: Sep. 6, 2022

(54) QUANTUM KEY DISTRIBUTION METHOD AND SYSTEM BASED ON TREE QKD NETWORK

(71) Applicants: State Grid Fujian Electric Power Co., Ltd., Fujian (CN); State Grid Fujian Fuzhou Electric Power Supply Company, Fujian (CN); State Grid Info—Telecom Great Power Science and Technology Co., Ltd., Fujian (CN)

(72) Inventors: Xi Chen, Fujian (CN); Lifan Yang, Fujian (CN); Gonghua Hou, Fujian (CN); Xinyi Lin, Fujian (CN); Wei Lin, Fujian (CN); Yuanzheng Wang, Fujian (CN); Baoping Zou, Fujian (CN); Xincheng Huang, Fujian (CN); Wei Chen, Fujian (CN); Siyuan Qian, Fujian (CN); Kai Li, Fujian (CN); Changgui Huang, Fujian (CN); Yuepian Ye, Fujian (CN); Xiao Feng, Fujian (CN); Jincheng Li, Fujian (CN); Jiefei Lin, Fujian (CN); Ruyin Chen, Fujian (CN)

(73) Assignees: State Grid Fujian Electric Power Co., Ltd., Fuzhou (CN); State Grid Fujian Fuzhou Electric Power Supply Company, Fuzhou (CN); State Grid Info-Telecom Great Power Science and Technology Co., Ltd., Xiamen (CN)

( * ) Notice: Subject to any disclaimer, the term of this patent is extended or adjusted under 35 U.S.C. 154(b) by 26 days.

(21) Appl. No.: 17/251,333

(22) PCT Filed: Sep. 18, 2020

(86) PCT No.: PCT/CN2020/116326
§ 371 (c)(1),
(2) Date: Dec. 11, 2020

(87) PCT Pub. No.: WO2021/098366
PCT Pub. Date: May 27, 2021

(65) Prior Publication Data
US 2021/0367773 A1 Nov. 25, 2021

(30) Foreign Application Priority Data
Nov. 21, 2019 (CN) .......................... 201911145256.0

(51) Int. Cl.
*H04L 29/06* (2006.01)
*H04L 9/08* (2006.01)
(52) U.S. Cl.
CPC ............ *H04L 9/0855* (2013.01); *H04L 9/085* (2013.01); *H04L 9/0827* (2013.01)
(58) Field of Classification Search
None
See application file for complete search history.

(56) References Cited

U.S. PATENT DOCUMENTS

| 7,512,242 | B2 * | 3/2009 | Pearson | ................ H04L 9/0855 380/278 |
| 8,483,394 | B2 * | 7/2013 | Nordholt | ............... H04L 63/062 380/278 |

(Continued)

*Primary Examiner* — Maung T Lwin

(57) ABSTRACT

The present disclosure relates to a quantum key distribution (QKD) method based on a tree QKD network. The method includes: judging a position of a parent node of the source node $S_0$ and a position of a parent node of the destination node $S_d$; if the parent node is a trusted relay node, directly transferring an initial shared key of the source node $S_0$ and the parent node to the destination node $S_d$ according to an exclusive OR (XOR) relay scheme, and ending the process; and if the parent node is an untrusted relay node, emitting, by the source node $S_0$ and the destination node $S_d$, photons to a measuring-device-independent quantum key distribu- (Continued)

tion (MDI-QKD) receiver of the parent node through a QKD emitter, generating a shared key by an MDI-QKD method, then transmitting the shared key according to the XOR relay scheme, and ending the process.

2 Claims, 3 Drawing Sheets

(56) References Cited

U.S. PATENT DOCUMENTS

| | | | | |
|---|---|---|---|---|
| 9,471,280 | B2* | 10/2016 | Shi | G06F 7/588 |
| 2005/0286723 | A1* | 12/2005 | Vig | H04L 9/0855 |
| | | | | 380/278 |
| 2015/0199179 | A1* | 7/2015 | Gimnich | G06F 8/10 |
| | | | | 717/104 |
| 2016/0352515 | A1* | 12/2016 | Bunandar | H04L 9/0852 |
| 2017/0222731 | A1* | 8/2017 | Lucamarini | H04B 10/70 |
| 2018/0039485 | A1* | 2/2018 | Wilber | G06F 7/588 |
| 2018/0241553 | A1* | 8/2018 | Lucamarini | H04B 10/70 |
| 2019/0280859 | A1* | 9/2019 | Kwiat | H04L 9/0822 |
| 2020/0351086 | A1* | 11/2020 | Walenta | H04L 9/0825 |
| 2020/0351087 | A1* | 11/2020 | Mccandlish | H04L 9/0827 |
| 2021/0385079 | A1* | 12/2021 | Curty Alonso | H04L 9/0838 |

* cited by examiner

QUANTUM KEY DISTRIBUTION METHOD AND SYSTEM BASED ON TREE QKD NETWORK

FIELD

The present disclosure relates to the field of quantum communication technologies, and more particular, to a quantum key distribution method and system based on a tree QKD network.

BACKGROUND

At present, commercial quantum secure communication systems are implemented mainly based on a quantum key distribution (QKD) technology. Based on the principle of quantum mechanics, QKD can securely distribute a shared random number sequence (which can be used as a symmetric key for encryption and decryption, message authentication, and other functions) between communication parties, and an attacker cannot eavesdrop on a public channel. Unlike classical cryptography, the security of quantum key distribution does not depend on the computational complexity of mathematical algorithms, but is based on the fundamental laws of quantum physics, which can provide a unique long-term security guarantee.

According to the structure and technical principle of a QKD system, if the implementation of the QKD system completely meets a protocol design, the QKD system can guarantee in principle that it is invalid to attack a quantum channel alone. If the implementation of the QKD system does not conform to a theoretical design, it may lead to a risk of key leakage. The following has to be guaranteed: (1) data transmitted by the QKD system on a classical channel cannot be tampered with; and (2) a terminal of the QKD system has to be trusted. Tree quantum network topology similar to bus topology is widely used in a reality scenario because of its easy scalability, but the security of an entire quantum network may be greatly threatened when a root node of tree topology is eavesdropped.

Measuring-device-independent quantum key distribution (MDI-QKD) can be immune to detector channel attacks. A detection device is provided between nodes to measure a Bell state of photons sent by a sender, and then a security key is obtained through a corresponding data post-processing system. However, because the performance of the MDI-QKD is limited by distances, it is difficult to popularize the MDI-QKD in practical applications.

In a reality tree network, only some nodes are trusted, but because of the existence of untrusted relay nodes, a trusted relay technology cannot implement secure quantum key distribution independently. Therefore, how to implement quantum key distribution of any two points in a scenario where trusted relay nodes and untrusted relay coexist is an urgent problem to be solved.

Tree topology is similar to combined network topology composed of multi-level star structures which have more and more nodes from top to bottom. A tree structure adopts a hierarchical centralized control mode. Each parent node manages its multiple child nodes, its transmission medium may have many branches, and each communication line supports bidirectional transmission, but these branches may not form a closed loop. Therefore, the tree topology has the following advantages: (1) being easy to extend; and (2) being prone to fault isolation. A tree topology structure can extend many branches and sub-branches, and these new nodes and branches are easy to be added to a network. The expansion of the quantum network is very complex, and the adoption of the tree quantum network topology can solve the problem of difficult addition of new quantum nodes. However, each node of the tree topology is strongly dependent on a root node. If a root node of a tree quantum network is eavesdropped by an attacker, the security of a large part of the network or even the whole network may be threatened. Therefore, the biggest problem faced by application of tree topology to quantum networks is that untrusted nodes may cause security threats that are difficult to bear.

Long-distance communication needs to overcome influences of a transmission medium loss on signals. In classical communication, an amplifier may be used to enhance signals. However, in quantum networks, an amplifier cannot be used because of the quantum non-cloning theorem. Based on quantum entanglement exchange, relay of quantum entanglement can be implemented, and then long-distance quantum communication can be implemented. However, a quantum relay technology is too difficult to be practical. At present, a transitional scheme adopted to construct remote quantum key distribution infrastructure is a trusted repeater scheme. A specific principle is as follows: a trusted repeater R is connected between a node A and a node B, and $K_{AB}$ is sent to the trusted repeater R after one-time-pad (OTP) encryption by $K_{AR}$, and $K_{AB}$ is obtained through decryption. The trusted repeater R uses the key $K_{AR}$ to re-encrypt $K_{AB}$ and sends $K_{AB}$ to the node B. The node B obtains $K_{AB}$ after decryption. Then, the node A and the node B can perform encrypted communication through the shared key $K_{AB}$.

In the trusted relay node, the key has lost its quantum properties and is no longer protected by the quantum principle. Therefore, in order to enhance the security protection of the trusted relay, an improved trusted relay scheme, i.e. an XOR relay technology, has been proposed. A difference of this scheme is that at the relay node, only a quantum key after XOR may be stored temporarily, while at the relay node, quantum key plaintext appears only within a short time after the key is generated, and it is difficult for an attacker to know a time point at which the quantum key is generated, thus improving the security of a user key.

An MDI-QKD protocol solves the problem of detector attacks. The protocol has high security and can make any attack against detection devices invalid. Secondly, compared with conventional QKD, the protocol also has great advantages in transmission distance. The protocol combined with a decoy state method can ensure the security of the use of a non-ideal single photon source. The trusted relay technology requires that the relay node be trusted, and when the relay node is attacked, the trusted relay may face great security threats. Trusted relay nodes and untrusted relay nodes coexist in a reality tree quantum network, so a trusted relay technology still has a non-negligible security problem in reality scenarios. At present, a transmission distance of MDI-QKD is limited, so how to break through a distance limit in the reality scenarios is a problem that an MDI-QKD scheme has to face to implement a wide range of practical application.

SUMMARY

In view of this, an objective of the present disclosure is to provide a quantum key distribution method and system based on a tree QKD network, which can implement quantum key distribution between any two points when some nodes are trusted in a tree network and effectively reduce construction and deployment costs of a quantum key distribution network.

The present disclosure is implemented using the following solutions: a quantum key distribution method based on a tree QKD network is provided; in a tree network, when parent nodes of a source node and a destination node are the same node, if the parent nodes are untrusted nodes, the source node and the destination node take the parent nodes as an MDI-QKD detector to generate a key, and if the parent nodes are trusted nodes, a shared key is directly transferred through XOR relay; and when the parent nodes of the source node and the destination node are not the same node and there are discontinuous untrusted relay nodes in a transmission path, the untrusted nodes are taken as an MDI-QKD detector to generate a key, and then the shared key is transferred through XOR relay.

Further, the method includes the following steps:

Step S1: Confirm a source node $S_0$ and a destination node $S_d$. Each node confirms, according to a broadcast message, whether there is a key generation request. Each node broadcasts a request to check whether the node needs to generate a key with another node.

Step S2: Determine a path from the source node $S_0$ to the destination node $S_d$. A path between a parent node of the source node $S_0$ and a parent node of the destination node $S_d$ is unique, and thus a path between the two nodes can be determined.

Step S3: Judge positions of the parent nodes of the source node $S_0$ and the destination node $S_d$, if the parent nodes of the source node $S_0$ and the destination node $S_d$ are the same node, perform step S4, and otherwise, perform step S5.

Step S4: If the parent nodes are trusted relay nodes, directly transfer an initial shared key of the source node $S_0$ and the parent node to the destination node $S_d$ through XOR relay, end the process and mark it as successful; and if the parent nodes are untrusted relay nodes, the source node S0 and the destination node $S_d$ emit photons to an MDI-QKD receiver of the parent node through a QKD emitter, generate a shared key by MDI-QKD, then transmit the key according to an XOR relay scheme, end the process, and mark the request as successful.

Step S5: If all relay nodes in the path are trusted, directly transfer an initial shared $K_1$ key to the destination node $S_d$ hop by hop through the XOR relay scheme, end the process and mark the request as successful; if a trusted relay and an untrusted relay coexist in a path, perform step S6.

Step S6: If untrusted relay nodes appear continuously, skip performing quantum key distribution, end the process and mark the request as failed; and if the untrusted relay nodes do not appear continuously, generate a key by taking the untrusted relay nodes as an MDI-QKD detector, and then transfer the shared key through XOR relay.

Further, in step S6, the if the untrusted relay nodes do not appear continuously, generating a key by taking the untrusted relay nodes as an MDI-QKD detector, and then transferring the shared key through XOR relay particularly includes the following steps:

Step S61: Transfer the shared key through XOR relay before an untrusted relay node appears.

Step S62: When the shared key is transferred to a previous trusted relay node $S_A$ of an untrusted relay node $S_u$, the node $S_A$ and another trusted relay node $S_B$ connected to the node $S_u$ emit photons to an MDI-QKD receiver of the node $S_u$ through the QKD emitter, and generate a security key $K_{AB}$ by using an MDI-QKD protocol when a receiver node is untrusted; and then send the shared key $K_1$ after $K_{AB}$ XOR encryption to the node $S_B$, the node $S_B$ XOR decrypts a received encryption key by using $K_{AB}$ to obtain the shared key $K_1$, and then completes key transmission from a trusted node to an untrusted node and then to a trusted node.

The same method is used when the same situation occurs again, until the initial shared key $K_1$ is transferred to the destination node $S_d$ and the request is marked as successful.

The present disclosure further provides a quantum key distribution system based on a tree QKD network, including more than one node, the nodes forming tree topology, and when key distribution is performed between two nodes, steps of the method described above being performed.

Compared with the prior art, the present disclosure has the following technical effects: the present disclosure provides a quantum key distribution method for a tree network in a scenario where trusted relay and untrusted relay coexist, and gives detailed schemes for a tree quantum network, which can implement quantum key distribution between any two points when some nodes in the network are trusted and effectively reduce construction and deployment costs of a quantum key distribution network.

DETAILED DESCRIPTION

The present disclosure is further described below with reference to the accompanying drawings and embodiments.

It should be noted that the following detailed descriptions are all illustrative and are intended to provide further clarification of this application. Unless otherwise specified, all technical and scientific terms used herein have the same meanings as normally understood by a person of ordinary skill in the art.

It is important to note that the terms used herein are intended only to describe specific implementations and are not intended to limit exemplary implementations according to this application. As used herein, the singular forms "a", "an" and "the" are intended to include the plural forms as well, unless the context clearly indicates otherwise. In addition, it should also be understood that when the terms "include" and/or "comprise" are used in this specification, they indicate the presence of features, steps, operations, devices, components and/or their combinations.

Figure 1:
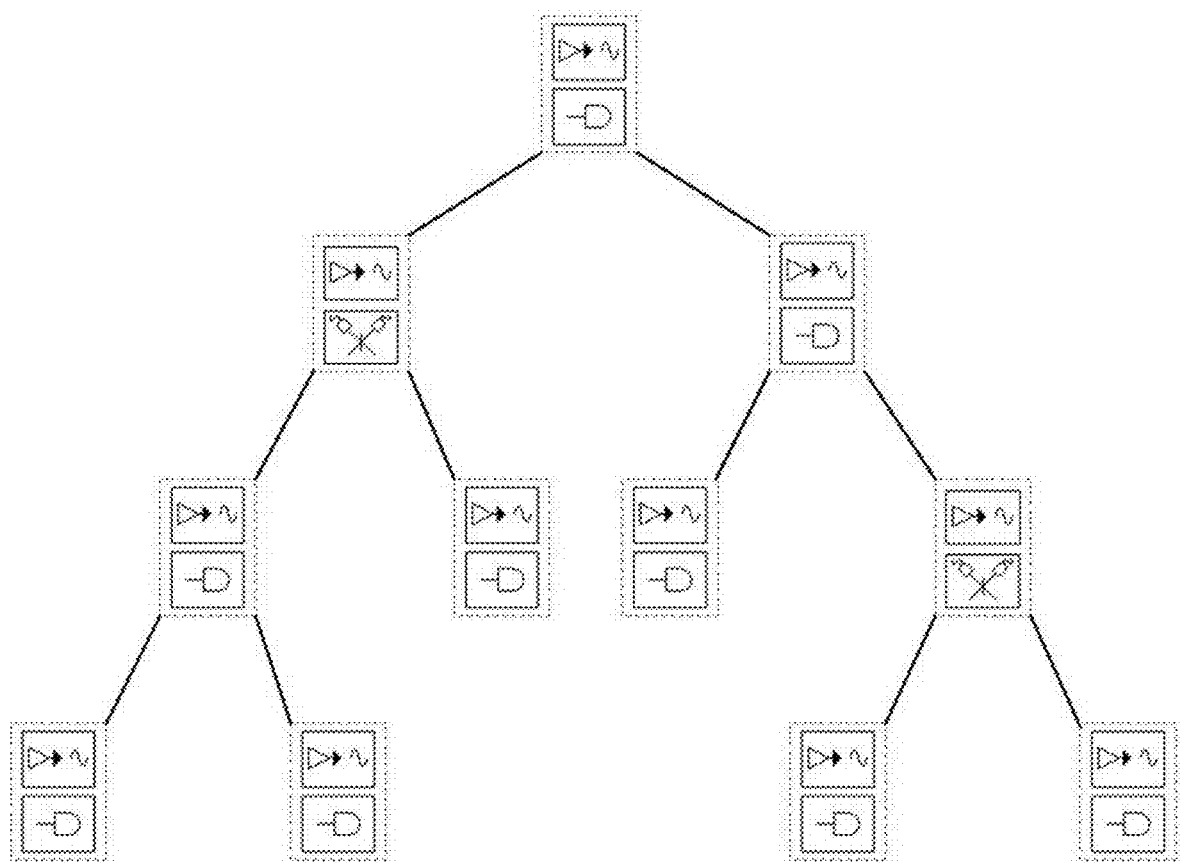
FIG. 1 is a deployment diagram of a tree network in a scenario where trusted relay and untrusted relay coexist according to an embodiment of the present disclosure.

Tree network topology is similar to bus topology. A tree network includes branches, and each branch may include multiple nodes. The tree network topology extends downward from a root node and has distinct hierarchy. A specific deployment diagram of the tree network is as shown in FIG. 1. The tree network has good expansibility, which can extend many branches and sub-branches, and it is easy to add new nodes. However, when a root node or a branch node is untrusted, a trusted relay technology alone cannot implement secure quantum key distribution. In such a scenario where trusted relay and untrusted relay coexist, a flowchart of a quantum key distribution method for any two points in a tree network is as shown in FIG. 2.

Figure 2:
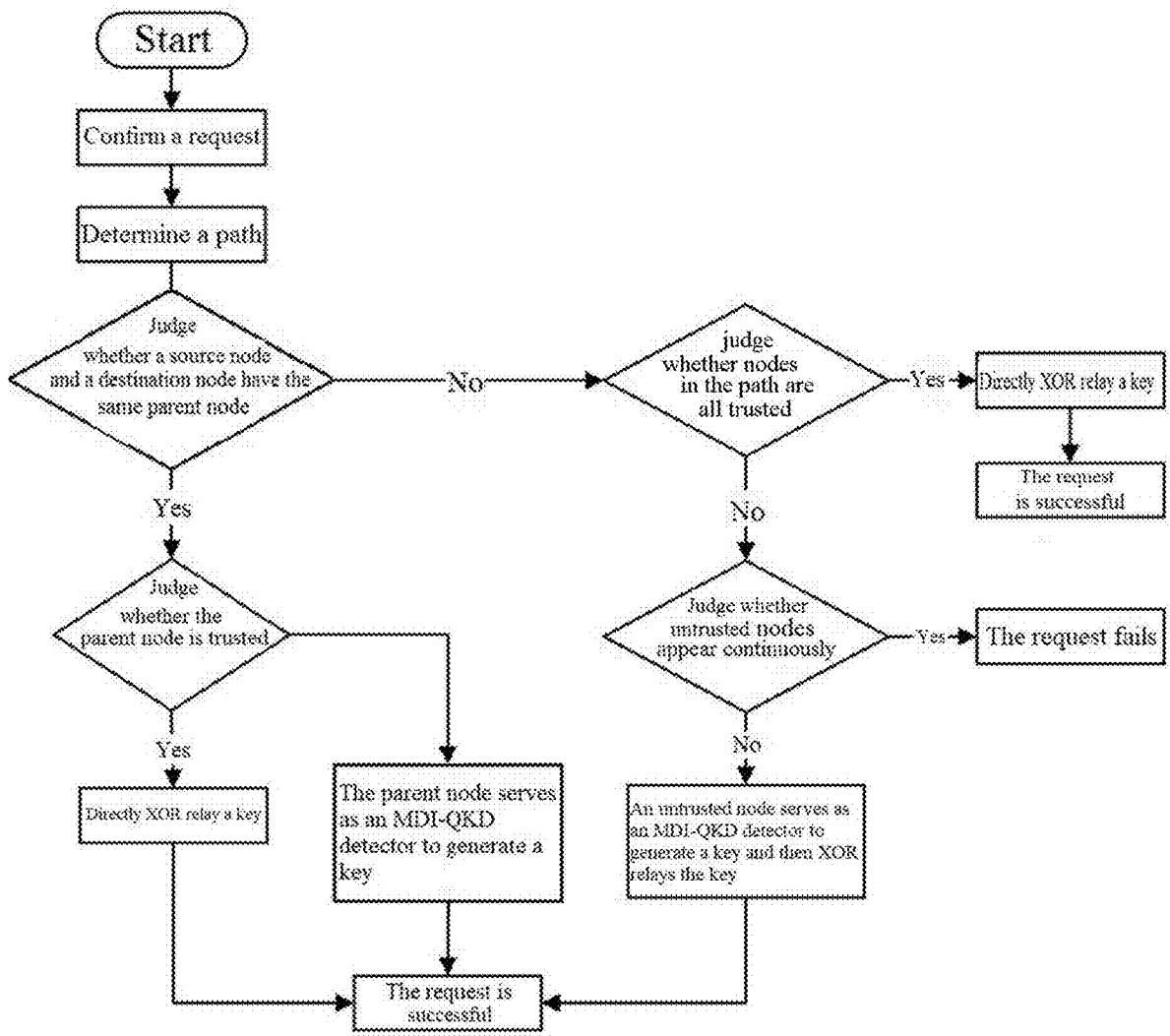
FIG. 2 is a schematic diagram of a method according to an embodiment of the present disclosure.

As shown in FIG. 2, this embodiment provides a quantum key distribution method based on a tree QKD network. In a tree network, when parent nodes of a source node and a destination node are the same node, if the parent nodes are untrusted nodes, the source node and the destination node take the parent nodes as an MDI-QKD detector to generate a key, and if the parent nodes are trusted nodes, a shared key is directly transferred through XOR relay; and when the parent nodes of the source node and the destination node are not the same node and there are discontinuous untrusted relay nodes in a transmission path, the untrusted nodes are taken as an MDI-QKD detector to generate a key, and then the shared key is transferred through XOR relay.

In this embodiment, the method includes the following steps:

Step S1: Confirm a source node $S_0$ and a destination node $S_d$. Each node confirms, according to a broadcast message, whether there is a key generation request. Each node broadcasts a request to check whether the node needs to generate a key with another node.

Step S2: Determine a path from the source node $S_0$ to the destination node $S_d$. A path between a parent node of the source node $S_0$ and a parent node of the destination node $S_d$ is unique, and thus a path between the two nodes can be determined.

Step S3: Judge positions of the parent nodes of the source node $S_0$ and the destination node $S_d$, if the parent nodes of the source node $S_0$ and the destination node $S_d$ are the same node, perform step S4, and otherwise, perform step S5.

Step S4: If the parent nodes are trusted relay nodes, directly transfer an initial shared key of the source node $S_0$ and the parent node to the destination node $S_d$ through XOR relay, end the process and mark it as successful; and if the parent nodes are untrusted relay nodes, the source node $S_0$ and the destination node $S_d$ emit photons to an MDI-QKD receiver of the parent node through a QKD emitter, generate a shared key by MDI-QKD, then transmit the key according to an XOR relay scheme, end the process, and mark the request as successful.

Step S5: If all relay nodes in the path are trusted, directly transfer an initial shared $K_1$ key to the destination node $S_d$ hop by hop through the XOR relay scheme, end the process and mark the request as successful; if a trusted relay and an untrusted relay coexist in a path, perform step S6.

Step S6: If untrusted relay nodes appear continuously, skip performing quantum key distribution, end the process and mark the request as failed; and if the untrusted relay nodes do not appear continuously, generate a key by taking the untrusted relay nodes as an MDI-QKD detector, and then transfer the shared key through XOR relay.

In this embodiment, in step S6, the if the untrusted relay nodes do not appear continuously, generating a key by taking the untrusted relay nodes as an MDI-QKD detector, and then transferring the shared key through XOR relay particularly includes the following steps:

Step S61: Transfer the shared key through XOR relay before an untrusted relay node appears.

Step S62: When the shared key is transferred to a previous trusted relay node $S_A$ of an untrusted relay node $S_u$, the node $S_A$ and another trusted relay node $S_B$ connected to the node $S_u$ emit photons to an MDI-QKD receiver of the node $S_u$ through the QKD emitter, and generate a security key $K_{AB}$ by using an MDI-QKD protocol when a receiver node is untrusted; and then send the shared key $K_1$ after $K_{AB}$ XOR encryption to the node $S_B$, the node $S_B$ XOR decrypts a received encryption key by using $K_{AB}$ to obtain the shared key $K_1$, and then complete key transmission from a trusted node to an untrusted node and then to a trusted node.

When the node $S_A$ is a source node, the node $S_A$ and the node $S_B$ use the node $S_u$ as a third-party detector to generate an initial password $K_1$ through an MDI-QKD protocol.

The same method is used when the same situation occurs again, until the initial shared key $K_1$ is transferred to the destination node $S_d$ and the request is marked as successful.

This embodiment further provides a quantum key distribution system based on a tree QKD network, including more than one node, the nodes forming tree topology, and when key distribution is performed between two nodes, steps of the method described above being performed.

Figure 3:
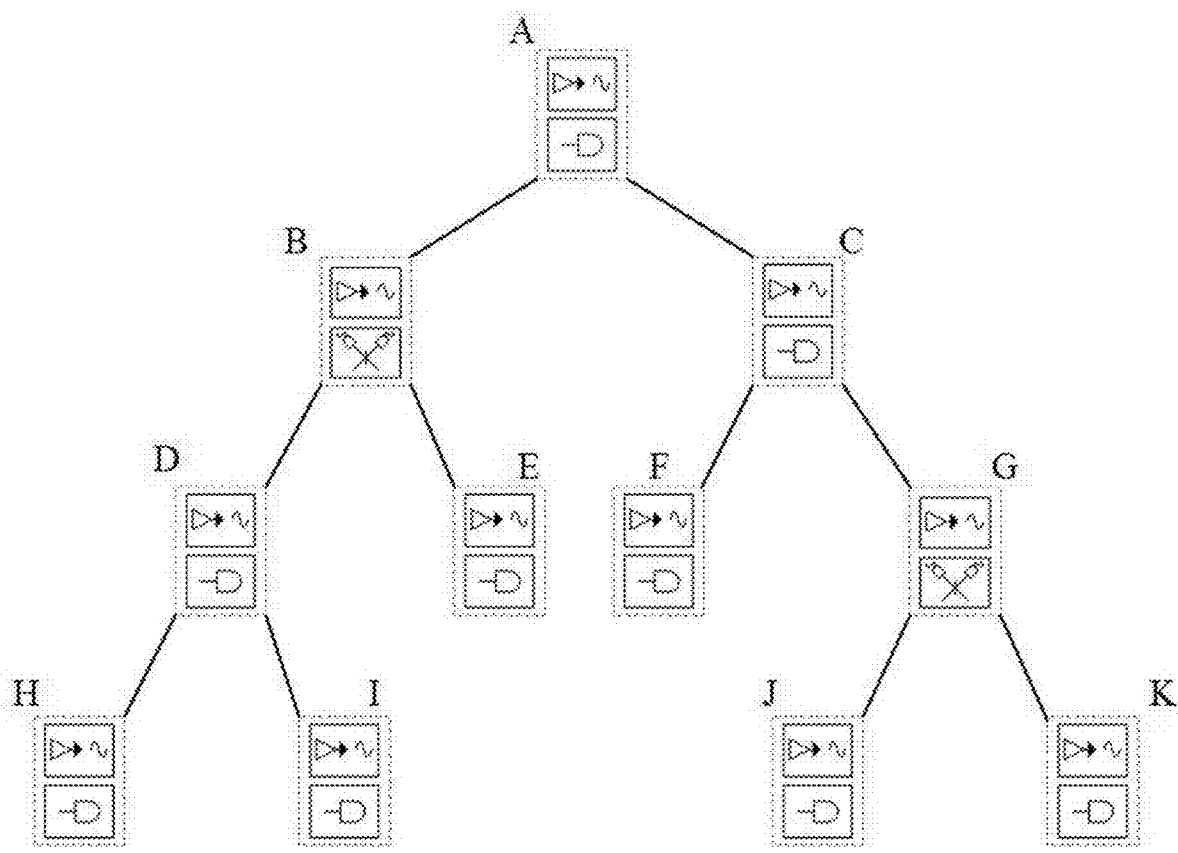
FIG. 3 is a diagram of a particular embodiment of a tree network in a scenario where trusted relay and untrusted relay coexist according to an embodiment of the present disclosure.

Particularly, as shown in FIG. 3, the following describes an embodiment of a quantum key distribution method for a tree network in a scenario where trusted relay and untrusted relay coexist. It is assumed that trusted relay nodes in a current network are known. As shown in FIG. 3, a node D receives a request for completing quantum key distribution with a node J. In the current network, nodes B and G are untrusted relay nodes, and the others are all trusted relay nodes.

Next, the request is completed according to the following steps:

Step 1: Confirm a request to obtain a source node D and a destination node J.

Step 2: Determine a path D→B→A→C→G→J.

Step 3: Two untrusted relay nodes, B and G, are known from the path and are not continuous on the path.

Step 4: The node D and the node A use the node B as a third-party detector to generate an initial key $K_0$ through an MDI-QKD protocol.

Step 5: The node A and the node C generate a shared key $K_1$ through a BB84 protocol.

Step 6: The node A uses the key $K_1$ to XOR encrypt $K_0$ and sends $K_0$ to the node C.

Step 7: The node C uses the key $K_1$ to XOR decrypt a received encryption key to obtain $K_0$.

Step 8: The node C and the node J use the node G as a third-party detector to generate an initial key $K_2$ through the MDI-QKD protocol.

Step 9: The node C uses the key $K_2$ to XOR encrypt $K_0$ and sends $K_0$ to the node J.

Step 10: The node J uses the key $K_2$ to XOR decrypt a received encryption key to obtain $K_0$, and the source node D and the destination node J share the initial key $K_0$, to complete the request.

A person skilled in the art should understand that the embodiments of this application may be provided as a method, a system, or a computer program product. Therefore, this application may be in the form of a complete hardware embodiment, a complete software embodiment, or an embodiment combining software and hardware. Moreover, this specification can be in the form of a computer program product implemented on one or more computer-usable storage media (including, but not limited to, a magnetic disk memory, a CD-ROM, an optical memory, and the like) including computer-usable program code.

This application is described with reference to flowcharts and/or block diagrams of the method, the device (system), and the computer program product according to the embodiments of this application. It should be understood that computer program instructions may be used to implement each process and/or block in the flowcharts and/or block diagrams and combinations of processes and/or blocks in the flowcharts and/or block diagrams. The computer program instructions may be provided to a general-purpose computer, a special-purpose computer, an embedded processor or a processor of another programmable data processing device to generate a machine, such that the computer or the processor of another programmable data processing device executes instructions to generate an apparatus configured to implement functions designated in one or more processes in a flowchart and/or one or more blocks in a block diagram.

The computer program instructions may also be stored in a computer-readable memory that can guide the computer or another programmable data processing device to work in a specific manner, such that the instructions stored in the computer-readable memory generates an article of manufacture including an instruction apparatus, and the instruction apparatus implements functions designated by one or more processes in a flowchart and/or one or more blocks in a block diagram.

The computer program instructions may also be installed in the computer or another programmable data processing device, such that a series of operation steps are executed on the computer or another programmable device to generate a computer implemented processing, and therefore, the instructions executed in the computer or another programmable terminal device provide steps for implementing functions designated in one or more processes in a flowchart and/or one or more blocks in a block diagram.

The above are merely preferred embodiments of the present disclosure, and are not limitations on other forms of the present disclosure. Any person skilled in the art can change or modify the technical contents disclosed above into equally varying equivalent embodiments. However, any simple alterations, equivalent changes and modifications made to the above embodiments according to the technical essence of the present disclosure without departing from the contents of the technical solutions of the present disclosure still come within the protection scope of the technical solutions of the present disclosure.

The invention claimed is:

1. A quantum key distribution (QKD) method based on a tree QKD network, comprising the following steps:

step S1: confirming a source node $S_0$ and a destination node $S_d$;

step S2: determining a path from the source node $S_0$ to the destination node $S_d$;

step S3: judging a position of a parent node of the source node $S_0$ and a position of a parent node of the destination node $S_d$; if the parent node of the source node $S_0$ and the parent node of the destination node $S_d$ are a same node, performing step S4, and if the parent node of the source node $S_0$ and the parent node of the destination node $S_d$ are different nodes, performing step S5;

step S4: if the parent node is a trusted relay node, directly transferring an initial shared key of the source node $S_0$ and the parent node to the destination node $S_d$ according to an exclusive OR (XOR) relay scheme, and ending the process; and if the parent node is an untrusted relay node, emitting, by the source node $S_0$ and the destination node $S_d$, photons to a measuring-device-independent quantum key distribution (MDI-QKD) receiver of the parent node through a QKD emitter, generating a shared key by an MDI-QKD method, then transmitting the shared key according to the XOR relay scheme, and ending the process; or step S5: if all relay nodes in the path are trusted, directly transferring the initial shared key $K_1$ to the destination node $S_d$ hop by hop according to the XOR relay scheme, and ending the process; if a trusted relay and an untrusted relay coexist in the path, performing step S6; and step S6: if two of untrusted relay nodes are found continuously in the path, skipping performing quantum key distribution, and ending the process; and if the untrusted relay nodes are not found continuously, generating the shared key by taking the untrusted relay nodes as the MDI-QKD detector, and then transferring the shared key according to the XOR relay scheme;

wherein the step S6 specifically comprises the following steps:

step S61: transferring the shared key according to the XOR relay scheme before the untrusted relay node appears; and step S62: when the shared key is transferred to the trusted relay node $S_A$ prior to the untrusted relay node $S_u$, emitting, by the node $S_A$ and another the trusted relay node $S_B$ connected to the node $S_u$, photons to an MDI-QKD receiver of the node $S_u$, through the QKD emitter, and generating a security key $K_{AB}$ via an MDI-QKD protocol when the node $S_u$ of the MDI-QKD receiver is untrusted; and then sending a encryption key obtained after XOR encryption of the shared key $K_1$ using $K_{AB}$ to the node $S_B$; XOR decrypting, by the node $S_B$, the encryption key by $K_{AB}$ to obtain the shared key $K_1$, and then completing key transmission from a trusted node to an untrusted node and then to a trusted node.

2. A quantum key distribution system based on a tree QKD network, comprising more than one node, the nodes forming tree topology, and the quantum key distribution system is enabled to implement the quantum key distribution method according to claim 1.

* * * * *